(12) United States Patent
Kowalski

(10) Patent No.: US 6,932,319 B2
(45) Date of Patent: Aug. 23, 2005

(54) LINEAR VALVE ACTUATOR

(75) Inventor: Keith Kowalski, Bethlehem, CT (US)

(73) Assignee: Tritex Corporation, Waterbury, CT (US)

( * ) Notice: Subject to any disclaimer, the term of this patent is extended or adjusted under 35 U.S.C. 154(b) by 69 days.

(21) Appl. No.: 10/480,552

(22) PCT Filed: Jun. 10, 2002

(86) PCT No.: PCT/US02/18503

§ 371 (c)(1),
(2), (4) Date: Dec. 12, 2003

(87) PCT Pub. No.: WO02/101274

PCT Pub. Date: Dec. 19, 2002

(65) Prior Publication Data

US 2004/0173770 A1 Sep. 9, 2004

Related U.S. Application Data

(63) Continuation of application No. 09/879,625, filed on Jun. 13, 2001, now abandoned.

(51) Int. Cl.⁷ .............................................. F16K 31/02
(52) U.S. Cl. .................................. 251/129.11; 251/292
(58) Field of Search ...................... 251/129.11, 129.12, 251/129.13, 291, 292

(56) References Cited

U.S. PATENT DOCUMENTS

| | | | | |
|---|---|---|---|---|
| 4,948,091 A | * | 8/1990 | Satoh et al. ............ | 251/129.11 |
| 5,364,066 A | * | 11/1994 | Dorste et al. ........... | 251/129.11 |
| 5,769,390 A | * | 6/1998 | Ando ..................... | 251/129.11 |
| 5,848,610 A | * | 12/1998 | Livernash et al. ...... | 251/129.12 |
| 6,217,452 B1 | * | 4/2001 | Marioni ....................... | 464/74 |
| 6,254,058 B1 | * | 7/2001 | Keller .................... | 251/129.11 |

FOREIGN PATENT DOCUMENTS

WO   WO 02/101274 A1  *  12/2002   ........... F16K/31/02

* cited by examiner

Primary Examiner—Eric Keasel
(74) Attorney, Agent, or Firm—John H. Crozier

(57) ABSTRACT

In a preferred embodiment, a linear actuator including: a rotary electric motor; a shaft (46) extending into a rotor (44) of the rotary electric motor and extendable into a body extension (30) of the valve; the shaft (46) having an externally threaded portion (36) extending into the rotor (44) and in engagement with a complimentary threaded internal surface of the rotor (44); and the shaft (46) having an externally splined portion (34) extendable into the body extension (30) of the valve and engageable with a complementary splined internal surface (110) of the extension (30) of the valve.

5 Claims, 5 Drawing Sheets

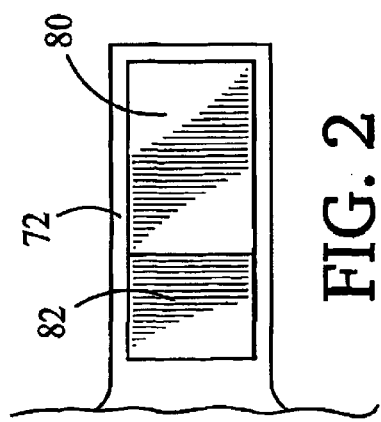
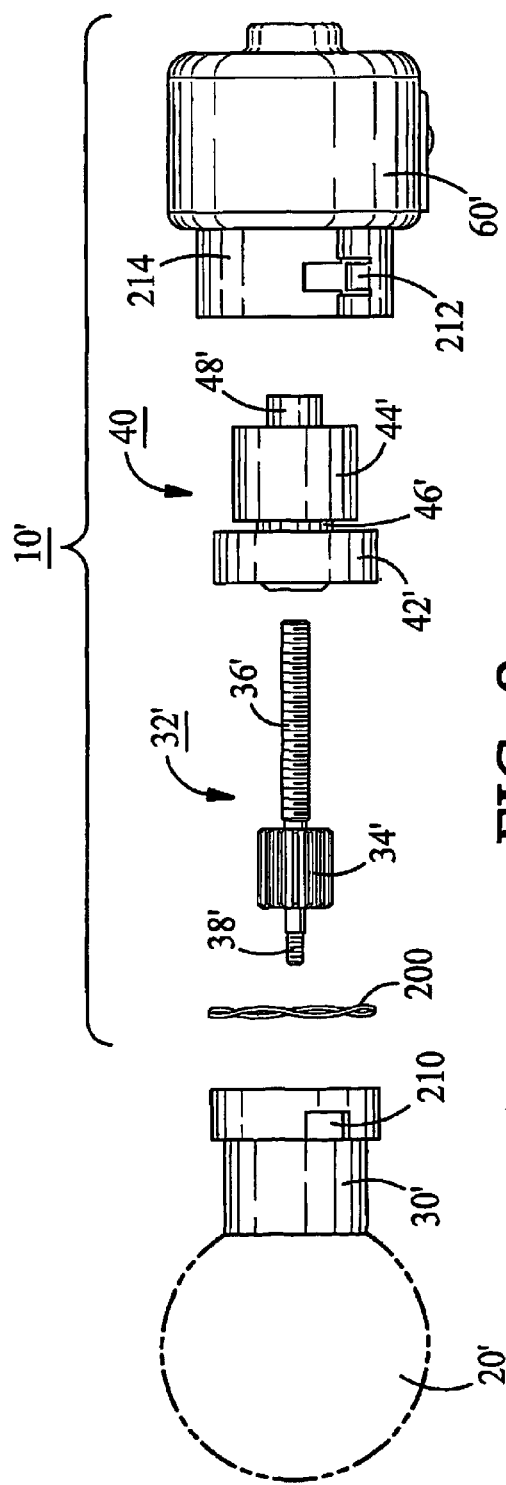

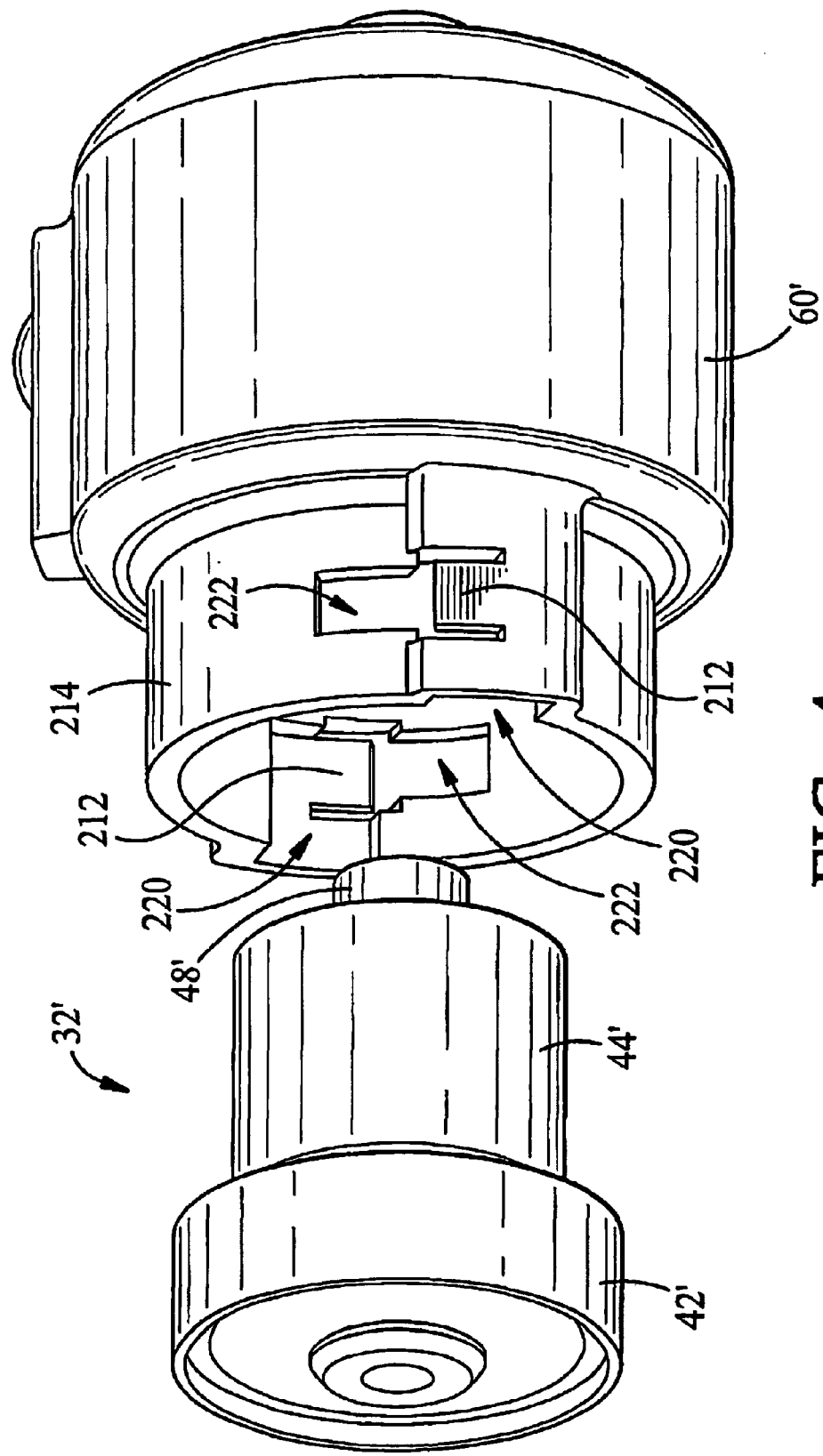

LINEAR VALVE ACTUATOR

The present application is a 35 USC 371 of PCT/US02/18503, filed Jun. 10, 2002, which is a continuation of U.S. Ser. No. 09/879,625, filed Jun. 13, 2001, now abandoned, both titled LINEAR VALVE ACTUATOR.

TECHNICAL FIELD

The present invention relates to valve actuators generally and, more particularly, but not by way of limitation, to a novel linear valve actuator of simple construction.

BACKGROUND ART

Valves are used in a wide variety of applications for controlling the flow of solid, liquid, and gaseous materials. Such control may be simply on or off or the rate of flow of the material may be controlled by the valve. In many cases, it is desirable to have a valve that is operated by a motor or actuator. Such cases include those in which the valve is automatically operated by a controller.

Many such valves require linear motion to effect the opening and closing of the valve and are controlled by linear actuators. Known conventional linear actuators suffer from various problems, among which are:

1. Alignment of the valve stem or plunger is difficult to maintain because of tolerance stack-up of the many components of the actuator.
2. A discrete valve and actuator combination is often difficult to assemble.
3. Discrete components are often redundant and, therefore, the resulting assembly is more expensive than necessary.

The root cause of most problems with linear valve actuators is that they are of separate construction from the valves that they operate.

Accordingly, it is a principal object of the present invention to provide a linear valve actuator that is simple.

It is a further object of the invention to provide such a linear valve actuator that has low parts count.

It is an additional object of the invention to provide such a linear valve actuator that is economical.

It is another object of the invention to provide such a linear valve actuator that is easily assembled with a linear valve.

Yet a further object of the invention is to provide such a linear valve actuator that permits accurate alignment of the valve stem or plunger with the components of the linear valve actuator.

Other objects of the present invention, as well as particular features, elements, and advantages thereof, will be elucidated in, or be apparent from, the following description and the accompanying drawing figures.

DISCLOSURE OF INVENTION

The present invention achieves the above objects, among others, by providing, in a preferred embodiment, a linear valve actuator, comprising: a rotary electric motor; a shaft extending into a rotor of said rotary electric motor and extendable into a body extension of said valve; said shaft having an externally threaded portion extending into said rotor and in engagement with a complementarily threaded internal surface of said rotor; and said shaft having an externally splined portion extendable into said body extension of said valve and engageable with a complementarily splined internal surface of said extension of said valve.

BRIEF DESCRIPTION OF DRAWINGS

Understanding of the present invention and the various aspects thereof will be facilitated by reference to the accompanying drawing figures, submitted for purposes of illustration only and not intended to define the scope of the invention, on which:

FIG. 2 is a fragmentary, top plan view of a mounting tab and a ramped surface on a linear valve actuator inserted into an opening defined in a locking tab of a linear valve body extension, according to the embodiment of FIG. 1.

FIG. 3 is an exploded side elevational view of another embodiment of the present invention.

FIG. 4 is a fragmentary isometric view of a portion of the actuator of FIG. 3.

BEST MODE FOR CARRYING OUT THE INVENTION

Figure 1:
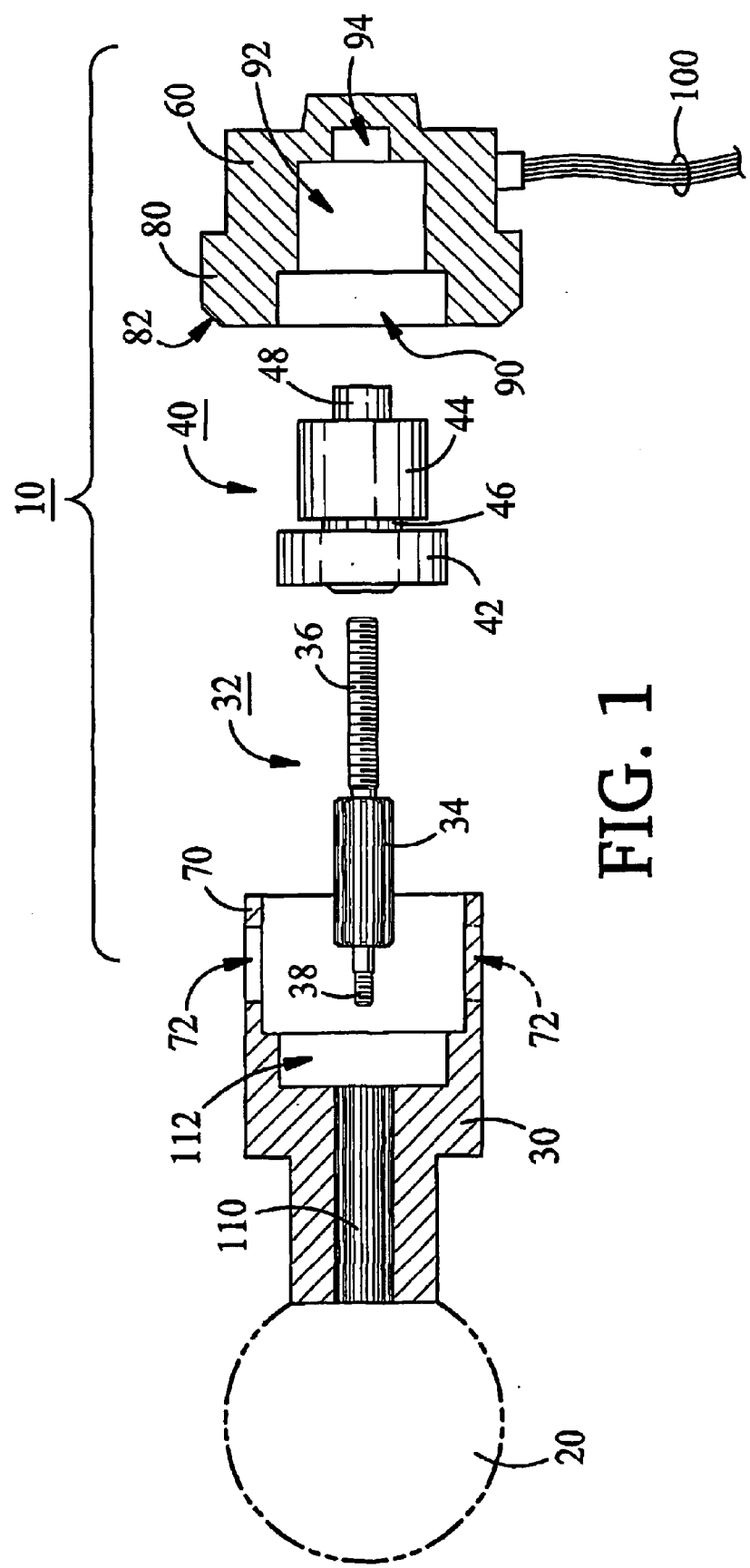
FIG. 1 is an exploded side elevational view, partially in cross-section, of a linear valve actuator according to one embodiment of the present invention, shown with a generic linear valve.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a linear valve actuator, constructed according to one embodiment of the present invention, the linear valve actuator being generally indicated by the reference numeral 10.

Linear valve actuator 10 is attachable to a valve body extension 30 of a valve body 20, the valve body being indicated only as a broken circle, since the details of construction of the valve body are conventional, and may take a variety of different forms. Valve body extension 30 may be furnished as part of linear valve actuator 10 or it may be furnished as part of linear valve 20.

Linear valve actuator 10 includes a shaft generally indicated by the reference numeral 32 and having a splined portion 34, a threaded portion 36, and an optional threaded portion 38 extending from the distal end of the splined portion, the latter portion, when provided, being used for connection to an element in valve body 20 (not shown). Other connection methods may be substituted for the optional threaded portion.

Linear valve actuator 10 further includes a rotor assembly generally indicated by the reference numeral 40 and having a ball bearing assembly 42 and a rotor 44 both integrally mounted on a hollow internally threaded shaft 46, the threaded surface thereof being complementary to threaded portion 36, a sleeve bearing extending from the distal end of the rotor, and an overmolded stator assembly 60.

All the foregoing elements of linear valve actuator 10 and valve body extension 30 are generally cylindrical and are axially aligned.

Valve body extension 30 has extending from the proximal end thereof two or more locking tabs 70 each having defined therethrough an opening 72. Stator assembly 60 includes integrally molded on the outer surface thereof an equal number of mounting tabs 80, complementary to and aligned with locking tabs 70 on valve body extension 30, and each having formed on the outer surface thereof a ramped portion 82, the ramped portions being provided to facilitate the insertion of the mounting tabs in openings 72. Valve body extension 30 also includes an axially extending, internally splined, generally cylindrical portion 110 complementary to splined portion 34 of shaft 32 and also includes an integrally molded bearing pocket 112.

Stator assembly 60 has an integrally molded cylindrical bearing pocket 90, a cylindrical central chamber 92, and a cylindrical end chamber 94. A plurality of lead wires 100 is attached to rotor assembly 60 to control the action of linear valve actuator 10.

When linear valve actuator is assembled, splined portion 34 of shaft 32 will be engagingly inserted into splined portion 110 of valve body extension 30 and threaded portion 36 of the shaft will be engagingly inserted into threaded shaft 46. Ball bearing assembly 42 will be inserted into both bearing pocket 112 in valve body extension 30 and bearing pocket 90 in stator assembly 90. The latter arrangement also serving as a locating feature. Rotor 44 will be inserted into central chamber 92 and sleeve bearing 48 will be inserted into end chamber 94.

Captivation of the elements of linear valve actuator 10 is achieved by the temporary elastic deformation of locking tabs 70 by ramped surfaces 82 and mounting tabs 80 as stator assembly 60 is inserted therebetween. When stator assembly 60 has been fully inserted into valve body extension 30, mounting tabs 80 and ramped surfaces 82 on the stator assembly snap into openings 72 defined through locking tabs 70 and the elements of linear valve actuator 10 are thus secured together. The engagement of a mounting tab 80 and a ramped surface 82 with an opening 72 is shown on FIG. 2.

FIG. 3 illustrates another embodiment of the present invention, generally indicated by the reference numeral 10', for activating an element (not shown) in a valve body 20'. Elements of actuator 10' similar or identical to those of actuator 10 (FIG. 1) are given primed reference numerals.

Actuator 10' includes an optional preload spring 200 that may be disposed between the proximal end of a valve body extension 30' and a ball bearing assembly 42' to provide a selected degree of preload to stator assembly 60', the preload spring accommodating tolerances between parts. Also, actuator 10' includes splined portion 34' of shaft 32' as an overmolded element. Captivation of the elements of actuator 10' is achieved by means of a pair of raised locking tabs 210 formed on the proximal end of valve body extension 30' with a pair of latching tabs 212 (only one of each shown on FIG. 3) formed on a collar extension 214 of stator assembly 60', as is described more fully below.

FIG. 4 illustrates more clearly the arrangement of the elements of collar extension 214. Here, two axially extending channels 220 are provided in collar extension 214, the inner walls of which are partially defined by the inner walls of latching tabs 212. Two openings 222 are provided in collar extension 214 adjacent latching tabs 212.

Figure 5:
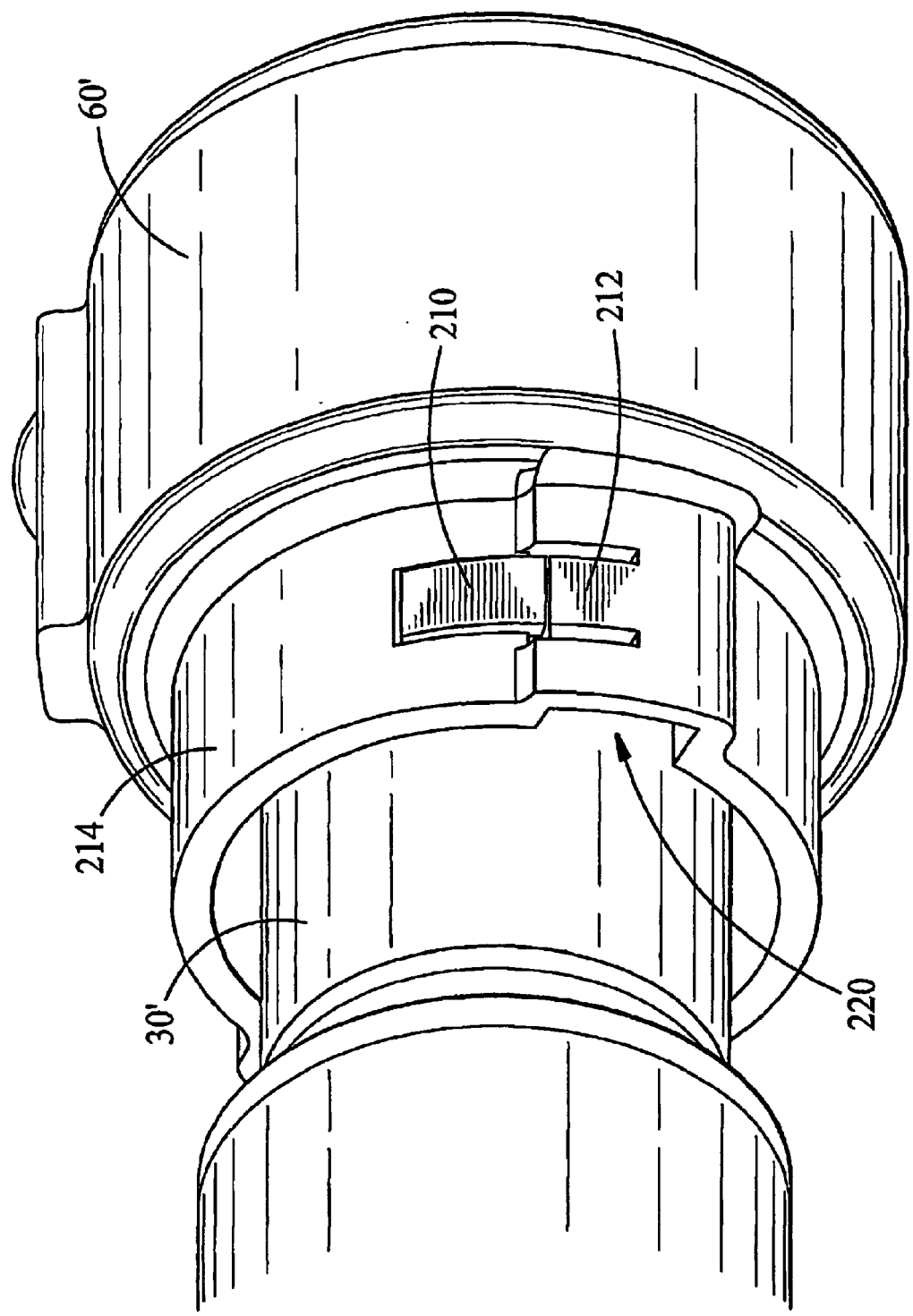
FIG. 5 is a fragmentary isometric view of a portion of the actuator of FIG. 3 with a valve body extension engaged therewith.
Figure 6:
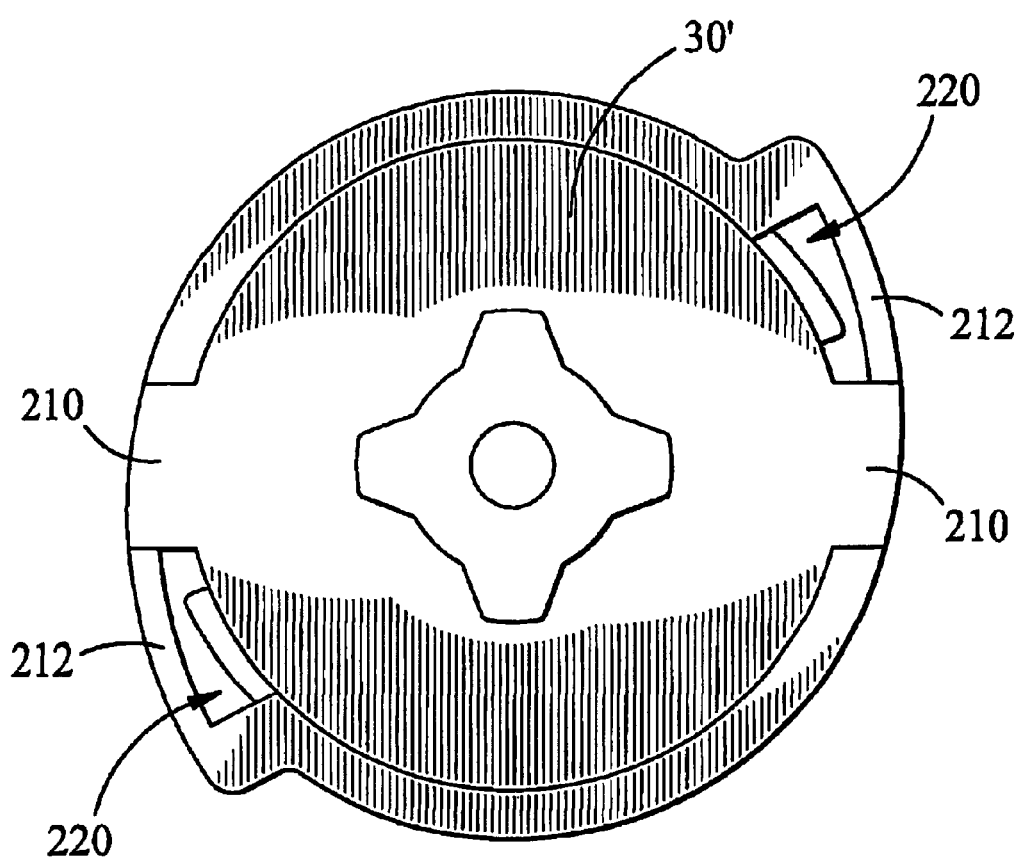
FIG. 6 is a cross-sectional view of the actuator of FIG. 3 with a valve body extension engaged therewith.

Referring now to FIGS. 5 and 6 together, valve body extension 30' is attached to collar extension 214, and therefore to actuator 10' (FIG. 3), by sliding locking cabs 210 into channels 220 and rotating valve body extension 30' (counterclockwise on FIG. 5 and clockwise on FIG. 6). This motion causes the ends of latching tabs 212 to elastically deformably extend outwardly, permitting locking tabs 210 to pass thereunder. When locking tabs 210 have fully entered openings 222 (FIG. 4), latching tabs 212 snap back into place, with the ends of the locking tabs and the latching tabs in adjacent mutual engagement, thus securing together actuator 10' and valve body 20'. The motion can be described as a simple "slide, twist, and lock" motion.

The elements of linear valve actuators 10 and 10' may be economically formed from suitable thermoplastic and metallic materials by conventional means, all known to those having ordinary skill in the art.

Some specific advantages of linear valve actuator 10 or 10' and valve 20 or 20' are:
1. Improved alignment of components, due to reduced parts count.
2. Reduced cost, due to the use of integrated components.
3. Ease of final assembly, due, in part, to the fact that no special tooling is required and, in fact, the components can be easily assembled by hand if desired.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spacially orienting terms such as "upper", "lower", "inner", "outer", "inwardly", "outwardly", "horizontal", "vertical", and the like, when used herein, refer to the positions of the respective elements shown on the accompanying drawing figures and the elements of the present invention are not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A linear valve actuator, comprising:
   (a) a rotary electric motor;
   (b) a shaft extending into a rotor of said rotary electric motor and extendable into a body extension of said linear valve actuator;
   (c) said shaft having an externally threaded portion extending into said rotor and in engagement with a complementarily threaded internal surface of said rotor;
   (d) said shaft having an externally splined portion extendable into said body extension of said valve and engageable with a complementarily splined internal surface of said extension of said valve;
   (e) said linear valve actuator and said body extension of said valve are attachable together by means of structure permitting a slide, twist, and lock motion;
   (f) a pair of locking tabs formed on an external surface of said body extension of said valve;
   (g) a pair of latches formed on an outer surface of a collar extension of a stator of an electric motor in said linear actuator;

(h) a pair of channels formed in an inner surface of said collar, inner surfaces of said latches defining part of inner surfaces of said channels;

(i) a pair of openings defined through said collar extension adjacent said latches; and (j) said locking tabs, said latches, and said openings being dimensioned such that said locking tabs can be inserted into said channels, said body extension of said valve being rotated while elastically deforming said latches outwardly, and said locking tabs then entering said pair of openings and permitting said latches to snap back into place, with ends of said locking tabs and said latches in mutual abutting relationship.

2. A linear valve actuator, as defined in claim 1, wherein:

said body extension of said valve is a part of said linear actuator.

3. A linear valve actuator, as defined in claim 1, wherein:

said rotor includes a bearing assembly insertable into pockets formed in said body extension of said valve and into a stator of said rotary electric motor.

4. A linear valve actuator, as defined in claim 1, wherein:

said linear actuator and said body extension of said valve are attachable together by means of points formed on an outer surface of a stator of said rotary electric motor engaging detents formed on inner surfaces of locking tabs extending from said body extension of said valve.

5. A linear valve actuator, as defined in claim 1, wherein:

said splined portion is overmolded onto said shaft.

* * * * *